(12) United States Patent
Saxena

(10) Patent No.: US 12,182,506 B2
(45) Date of Patent: Dec. 31, 2024

(54) SYSTEMS AND METHODS FOR DYNAMIC LARGE LANGUAGE MODEL PROMPT GENERATION

(71) Applicant: Shopify Inc., Ottawa (CA)

(72) Inventor: Utkarsh Saxena, Toronto (CA)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/322,377

(22) Filed: May 23, 2023

(65) Prior Publication Data

US 2024/0330579 A1 Oct. 3, 2024

Related U.S. Application Data

(60) Provisional application No. 63/493,833, filed on Apr. 3, 2023.

(51) Int. Cl.
*G06F 40/186* (2020.01)
*G06F 16/958* (2019.01)

(52) U.S. Cl.
CPC .......... *G06F 40/186* (2020.01); *G06F 16/958* (2019.01)

(58) Field of Classification Search
CPC ... G06F 40/186; G06F 16/986; G06N 3/0455; G06N 3/084
See application file for complete search history.

(56) References Cited

U.S. PATENT DOCUMENTS 11,860,914 B1 * 1/2024 Qadrud-Din .......... G06F 40/289

* cited by examiner

*Primary Examiner* — Asher D Kells
(74) *Attorney, Agent, or Firm* — Perkins Coie LLP

(57) ABSTRACT

A website development system automatically generates text for a webpage. The system obtains a prompt template associated with a section of the webpage, where the prompt template includes one or more parameters. Based on the webpage, the prompt template determines a first value for a first one of the one or more parameters. A request to provide input for a second value of a second parameter is sent for display to a user. Using the prompt template, the first value, and the second value, the system generates a prompt to a large language model to generate text for the section of the webpage.

20 Claims, 10 Drawing Sheets

SYSTEMS AND METHODS FOR DYNAMIC LARGE LANGUAGE MODEL PROMPT GENERATION

CROSS-REFERENCE TO RELATED APPLICATION

This application claims the benefit of U.S. Provisional Application No. 63/493,833, filed Apr. 3, 2023, which is incorporated herein by reference in its entirety.

TECHNICAL FIELD

This disclosure related to large language models (LLMs), and in particular to dynamically generating prompts to LLMs.

BACKGROUND

Webpages often include a significant amount of text that is used to describe, for example, information about an entity affiliated with the webpage or about products or services offered by the entity. Accordingly, a user creating or modifying a webpage typically must write a significant amount of text for the page.

BRIEF DESCRIPTION OF THE DRAWINGS

Detailed descriptions of implementations of the present invention will be described and explained through the use of the accompanying drawings.

Figure 1:
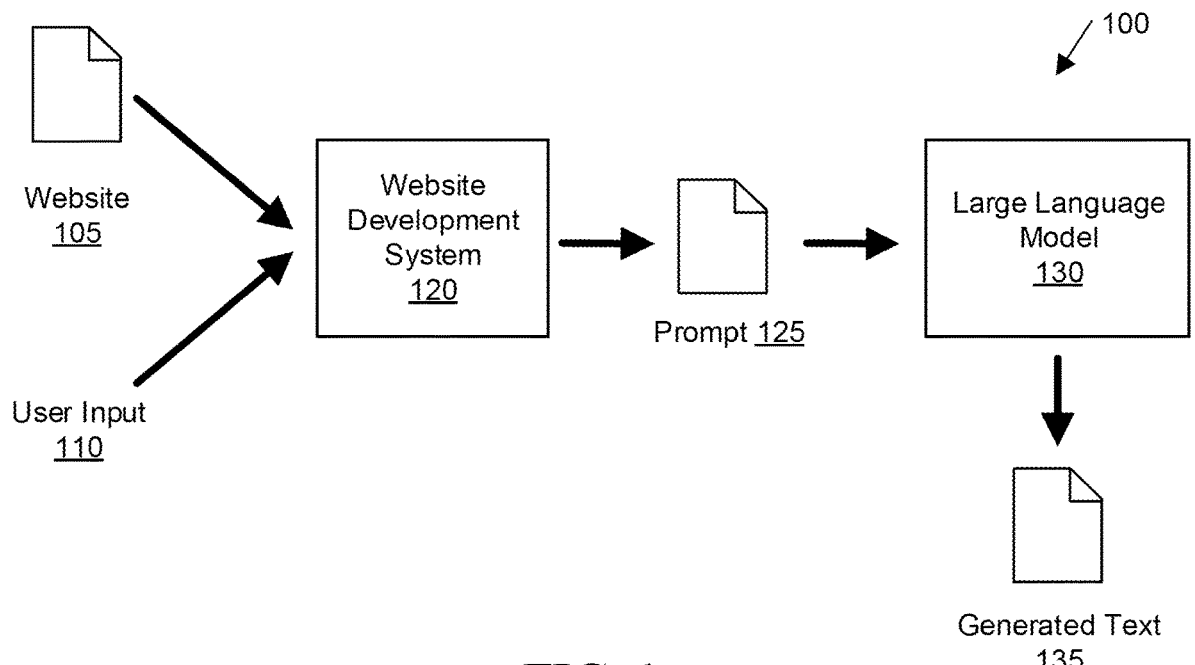
FIG. 1 is a block diagram illustrating an environment in which a website development system operates, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications

DETAILED DESCRIPTION

Websites have become a critical channel for communicating information, and many entities find their websites to be a necessary component of operating their business or organizations to share information with current or potential consumers. Although it is important for an entity's website to communicate information clearly and effectively to the website's visitors, writing text for a website can be a burdensome process, and one that is often orthogonal to an entity's core competencies. Entities are therefore increasingly turning to large language models to help them quickly and efficiently prepare text for websites. However, it can be difficult to generate prompts that will cause the text produced by a large language model to be appropriate for the context in which the text will appear. It is especially difficult to generate these prompts programmatically.

To solve this problem, a website development system according to implementations herein enables LLM-based text generation for a website by automating the generation of a prompt using data retrieved or derived from the website. According to some implementations, the website development system obtains a prompt template associated with a section of a webpage. The prompt template includes one or more parameters, and a first value for a first one of the one or more parameters is determined based on the webpage. The website development system can also send a request to a user to provide input for a second value corresponding to a second one of the parameters in the prompt template. Using the prompt template, the first parameter value, and the second parameter value, the website development system generates a prompt to a large language model to generate text for the section of the webpage.

Website Development System

FIG. 1 illustrates an environment 100 in which a website development system 120 operates, according to some implementations.

A website 105 can include one or more webpages, each of which has one or more sections that represent different units of content on the webpage. For example, webpages may include sections such as an announcement bar, a description of the organization operating the webpage, a slide show with multiple image or text blocks, and/or an image with associated text that describes the image. A user can interact with the website development system 120 to modify the website 105, including creating new webpages within the website, adding new content to a webpage, or modifying existing content on a webpage.

The website development system 120 receives data associated with the website 105 and/or user input 110 and, using the website data or user input, generates a prompt 125 to a large language model (LLM) 130. The LLM 130 can include any commercially available or custom models, or a set or ensemble of two or more models. Example features of LLMs are described with respect to FIGS. 5-6.

The LLM 130 uses the prompt to generate text 135. The website development system 120 can then add the generated text 135 to the website 105. Accordingly, the website development system 120 facilitates automated text generation for a website.

Figure 2:
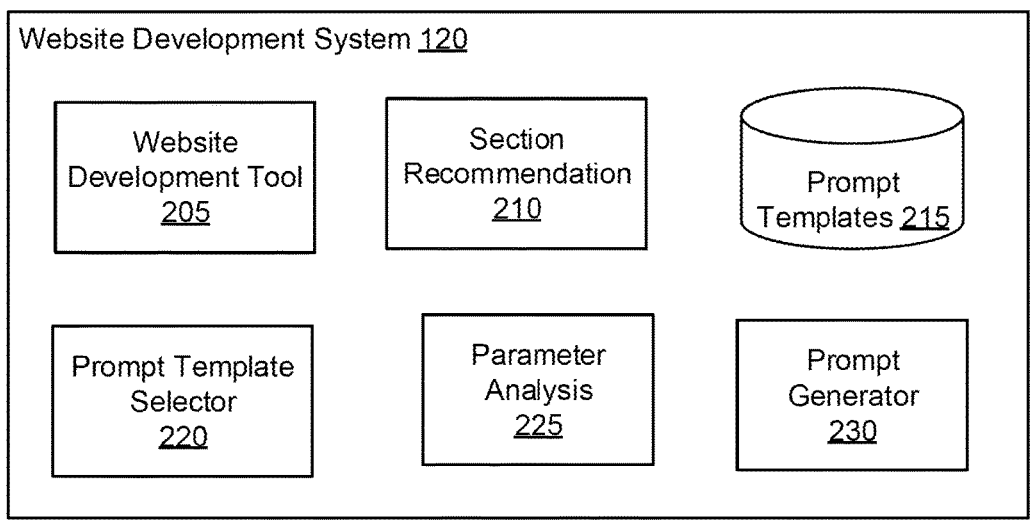
FIG. 2 is a block diagram illustrating functional modules executed by the website development system, according to some implementations.

FIG. 2 is a block diagram illustrating functional modules executed by the website development system 120, according to some implementations. As shown in FIG. 2, an example implementation of the website development system 120 includes a website development tool 205, a section recommendation module 210, a prompt templates store 215, a prompt template selector 220, a parameter analysis module 225, and a prompt generator 230. The website development system 120 can include additional, fewer, or different modules, and functionality described herein can be divided differently between the modules. As used herein, the term "module" refers broadly to software components, firmware components, and/or hardware components. Accordingly, the modules 205, 210, 220, 225, and 230 could each be comprised of software, firmware, and/or hardware components implemented in, or accessible to, the website development system 120.

Figure 3A:
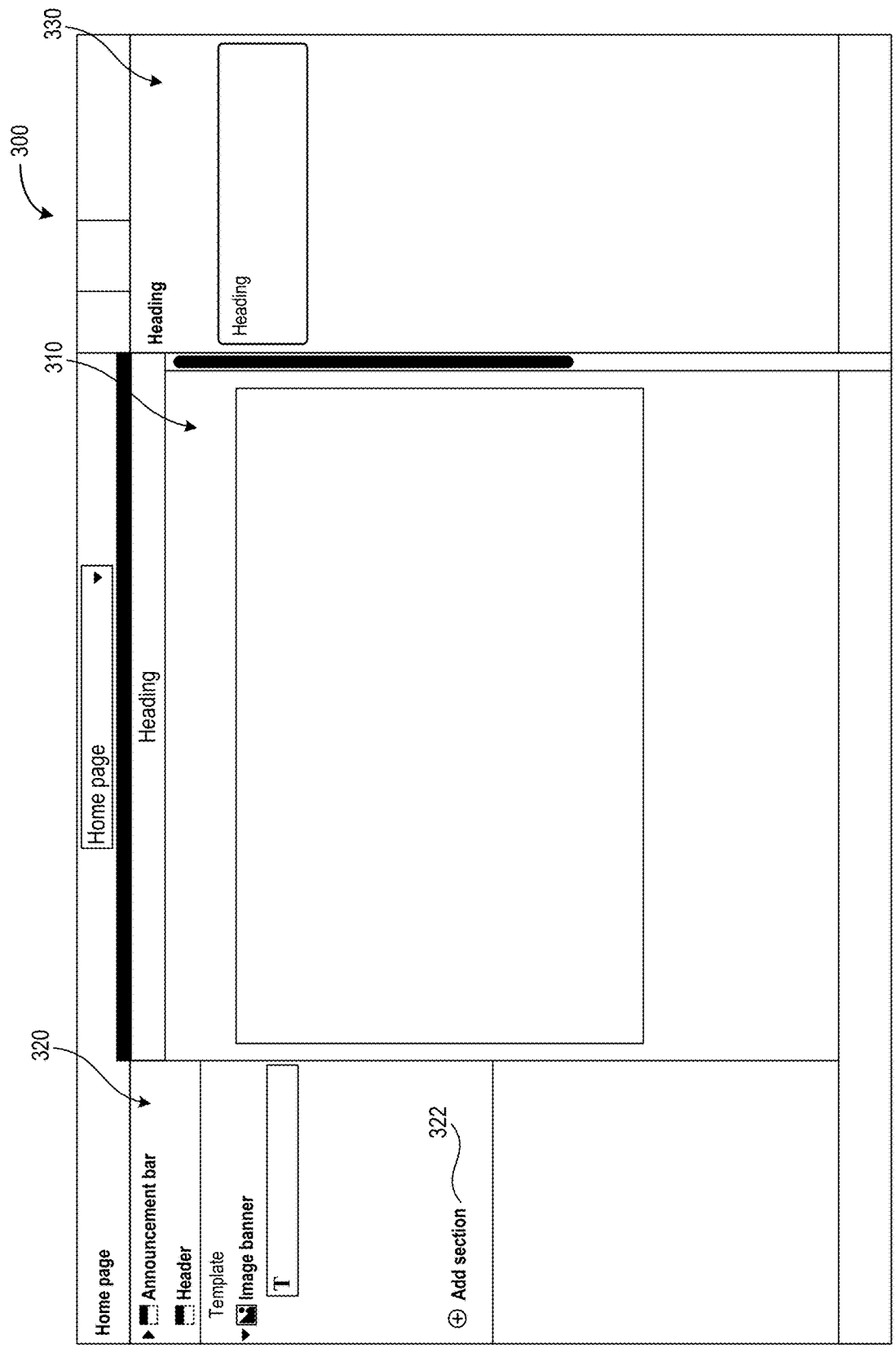
FIG. 3A illustrates an example website development interface.

The website development tool 205 generates user interfaces and receives inputs from users to create or modify websites with automatically generated text. An example interface 300 output by the website development tool 205 for creating a webpage is illustrated in FIG. 3A. As shown in FIG. 3A, the website development interface 300 includes a canvas 310 that displays the appearance of a webpage as it is developed using the tool 205. A navigation pane 320 displays sections of the webpage (e.g., announcement bar, header, and image banner) and enables the user to add a new section to the webpage (e.g., by selecting the "add section" control 322). A section editing pane 330 enables the user to edit content of a section selected in the navigation pane 320. For example, as shown in FIG. 3A, the "heading" section is selected for editing the section editing pane 330.

Returning to FIG. 2, the section recommendation module 210 recommends a type of section to add to a webpage. When a user selects an option in the website development tool 205 to "Add Section" (e.g., the control 322 in FIG. 3A), the section recommendation module 210 determines one or more recommended section types and causes the website development tool 205 to display the recommended section types to the user.

In some implementations, the section recommendation module 210 generates recommendations for a next section using a machine learning model that has been trained based on layout of other websites. For example, the section recommendation module 210 or another system analyzes websites that are operated by entities that are similar to the entity operating the website under development or websites that relate to similar products or services. The training system extracts data from these similar websites, such as types of sections that appear on the same webpage and positions of these sections on the page. The extracted data is used to train a recommendation model that can recommend a type of section to be added to a webpage based on, for example, types and positions of other sections already on the webpage, a position of the section on the webpage, an identity of the organization operating the webpage, or style or tone of text in other sections.

Alternatively, the section recommendation module 210 can recommend a section type for a new section based on an intended location for the new section on the webpage. For example, if the user indicates the section will be placed near the top of the webpage, the section recommendation module 210 may recommend an "announcement bar" section type. A section placed near the bottom of the webpage may have a recommended section type of "frequently asked questions." In some implementations, if a user moves a section from one position to another position on the webpage, the section recommendation module 210 recommends changing the section type for the section from a first section type to a second type. Alternatively, the section recommendation module 210 can automatically modify the section type for the section based on the move. The section recommendation module 210 may notify the user or request user approval for the modification before enacting it.

The prompt templates store 215 is a repository of prompt templates that can be used by other components of the website development system 120 to generate prompts to the LLM 130. Each prompt template includes at least one parameter, a value for which is selected to generate a unique prompt to the LLM 130. Example parameters include the name of the entity that operates the webpage, a brand name associated with the operating entity, a type of the entity that operates the webpage or an industry in which the entity operates, a product type of a product described or sold through the website, or tone for the generated text. A prompt template can also include other fixed content that does not vary across prompts, such as content that describes the type of text to be generated or that contextualizes the parameters in the template. An example prompt template, in which parameters are indicated by curly brackets, is as follows:

Name of my brand is {{Brand name}}. We are a {{Industry}} brand selling {{Types of Products}}. The tone of the brand is {{Brand Tone}}. Can you generate a {{Style & tone}} announcement for a {{SectionType}} section, short, under 10 words, that includes {{Keywords}}?

Each prompt template can be associated with a type of webpage section. For example, a first prompt template can be associated with (and used to generate text for) a first type of webpage section (e.g., an announcement bar) while a second, different prompt template is associated with a second type of webpage section (e.g., a company description section). The available webpage section types offered by the website development system 120 can each have one or more associated prompt templates. Alternatively, each prompt template can be associated with a location on a webpage, such that a template corresponds to a section that is placed at the associated location.

The prompt template selector 220 obtains a prompt template to use to generate text for a particular section of a particular webpage. The prompt template can be selected based on section type, such as the prompt template selector 220 retrieving the prompt template associated with the section type from the prompt templates store 215. When multiple templates are associated with the same section type, the particular prompt template used to generate text for the section can be selected based on other attributes of the webpage or the entity that operates the webpage (e.g., using a first template for a webpage associated with a first type of person or company and a second template for a webpage associated with a second type of person or company). Alternatively, a first template can be used to initially generate text for a given section, while a second template is used if a user requests regeneration of the text.

In some implementations, the prompt template selector 220 selects a prompt template based on the location of the section on the webpage. If the user moves a section from one location on the webpage to another location, the prompt template selector 220 obtains a different prompt template. For example, the selector 220 obtains a template associated with the new location of the section, or updates the section type of the section based on its relocation and obtains a template associated with the new section type.

The parameter analysis module 225 determines a value for each of the one or more parameters in the selected prompt template. The parameter analysis module 225 can use website data or previously supplied user inputs to determine some parameter values, reducing the amount of input the user needs to provide to generate the LLM prompt. For example, at the time that a user adds a new section to a webpage, the webpage (or the website containing the webpage) may already include some information relevant to the prompt template associated with the new section. Such information can appear explicitly or implicitly in the content of the webpage or website itself or in an account of an entity affiliated with the website. When a user adds a new section to a webpage, the parameter analysis module 225 accesses this webpage data to determine if the value of a parameter can be automatically retrieved or derived.

In an example, a parameter in the selected prompt template is a brand name of an entity associated with the webpage or a product or service offered by the entity. A user may have provided the brand name for another section on the website or when the user created an account to use the website development tool 205. Accordingly, the parameter analysis module 225 can query the website data or user account data to retrieve the brand name when required by a prompt template.

Another example parameter is a product type for a product sold or advertised on the website. Like brand name, the product type may have been provided by the user for another section of the webpage or in a user account. Alternatively, the parameter analysis module 225 categorizes a product based on a description of the product provided by the user, based on an image of the product uploaded by the user, or based on other signals supplied by the user.

Still another example parameter that may be used in prompt templates is an indication of the tone or style of the text that the LLM should generate. Tones that can be used for website text include, for example, "catchy and creative," "bold and energetic," "fun and playful," "informative and educational," "short and factual," or "luxurious and relaxing." In some implementations, the parameter analysis module 225 determines a value for a tone parameter by sending other text on the website to the LLM 130 to characterize the tone of the other text. If multiple tones are used on the website, the parameter analysis module 225 can select the tone to use for a given section based on, for example, a type of the section (e.g., such that sections of a given section type across the website use the same or similar tones) or the particular webpage on which the section will appear (e.g., to keep tone the same or similar across a given webpage within the website). Alternatively, the parameter analysis module 225 can extrapolate between multiple tones used on the website. Additionally, rather than sending the other text to the LLM for analysis, the parameter analysis module 225 can itself process or cause another system to process text from the website using a tone embedding model that uses a trained neural network to generate an embedding representing the tone of the text.

In other implementations, the parameter analysis module 225 infers tone based on a type of entity that operates the website, a type of section to be added to the webpage, or a type of item to be described by the section. For example, when a user adds a product description section for a laptop, the parameter analysis module 225 may automatically recommend a tone of "short and factual" for the section. When a user adds a product description section for a spa kit, the module 225 may automatically recommend a tone of "luxurious and relaxing." Any section generated on a website operated by a gaming company targeted towards children may be assigned a "fun and playful" tone.

In still other implementations, the parameter analysis module 225 selects a tone for a given webpage based on a predicted audience for the webpage. For example, the parameter analysis module 225 identifies a set of websites that are similar to the webpage under development, such as websites operated by similar entities, websites selling similar types of products, or websites offering similar types of services. From the set of similar websites, the parameter analysis module 225 retrieves audience data such as age, gender, or income of the typical visitor to the similar website. Alternatively, the entity associated with the webpage under development can provide explicit input specifying the expected target audience of the webpage. The parameter analysis module 225 can maintain a mapping between audience data and corresponding tone to use for a website, and use the mapping to select the tone to use for the webpage under development based on the predicted or targeted audience.

The parameter analysis module 225 can also obtain parameter values by sending a request for input from a user of the website development tool 205. In some implementations, if the parameter analysis module 225 identifies multiple candidate values for a given parameter, the module 225 causes the candidate values to be output to the user for selection of one of the values (or to provide an alternative value). For example, if the parameter analysis module 225 detects multiple tones that have been used throughout the website to which the webpage belongs, the module may request user input to select a tone from among the detected tones. In some implementations, the parameter analysis module 225 assigns a confidence score to its determination of a parameter value. If the prompt template includes any parameters for which the parameter analysis module 225 has not determined a corresponding value with at least a specified confidence score, the module 225 can send a request to a user to confirm a low-confidence parameter value or to provide input to specify the parameter value. The parameter analysis module 225 can also request user input to confirm any automatically determined parameter values.

The prompt generator 230 uses the prompt template and any parameters determined by the parameter analysis module 225 or received from a user to generate a prompt to the LLM 130.

Figure 3B:
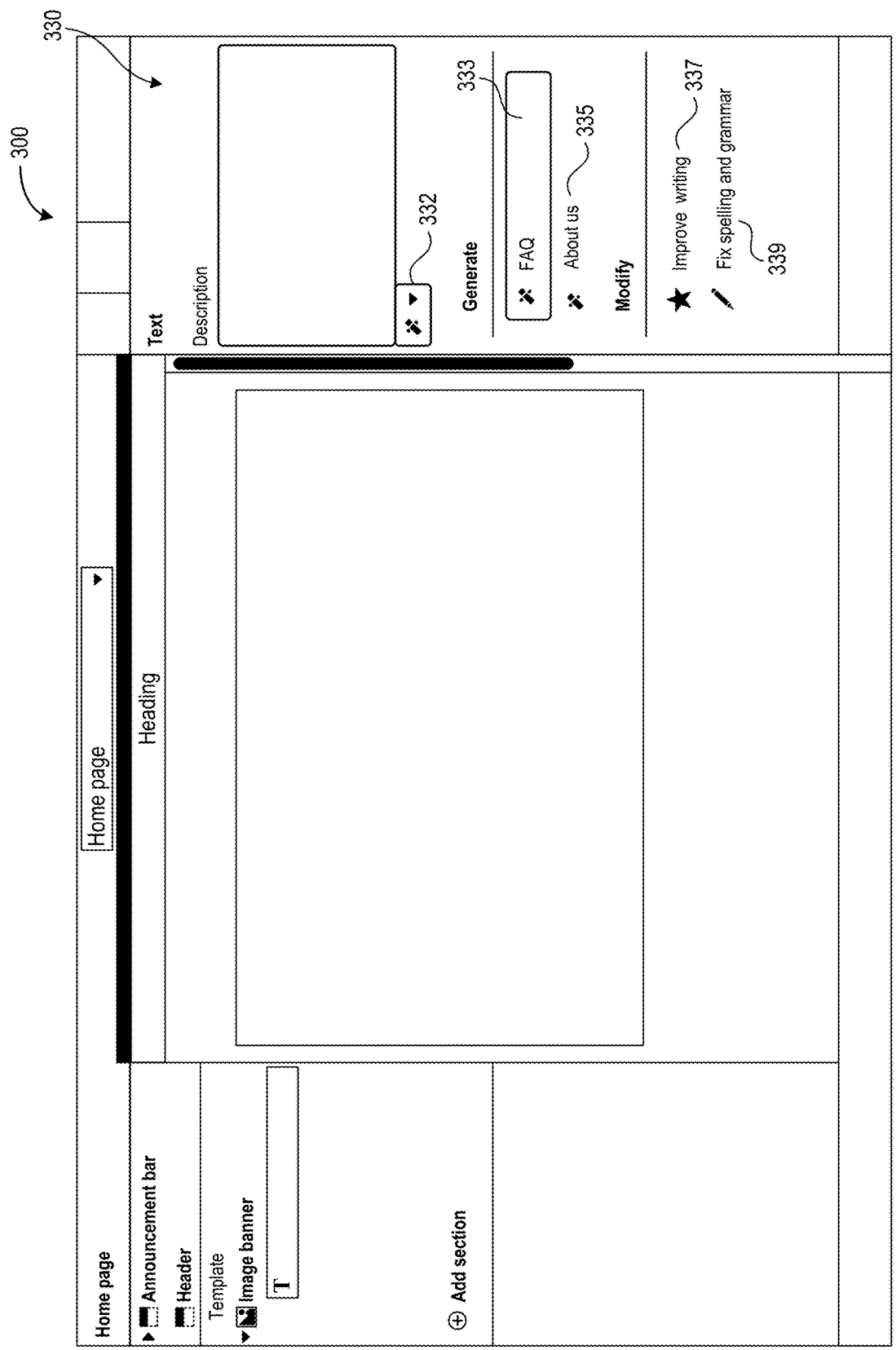
FIGS. 3B-3C illustrate example user interfaces for receiving user inputs for prompt generation.
Figure 3C:
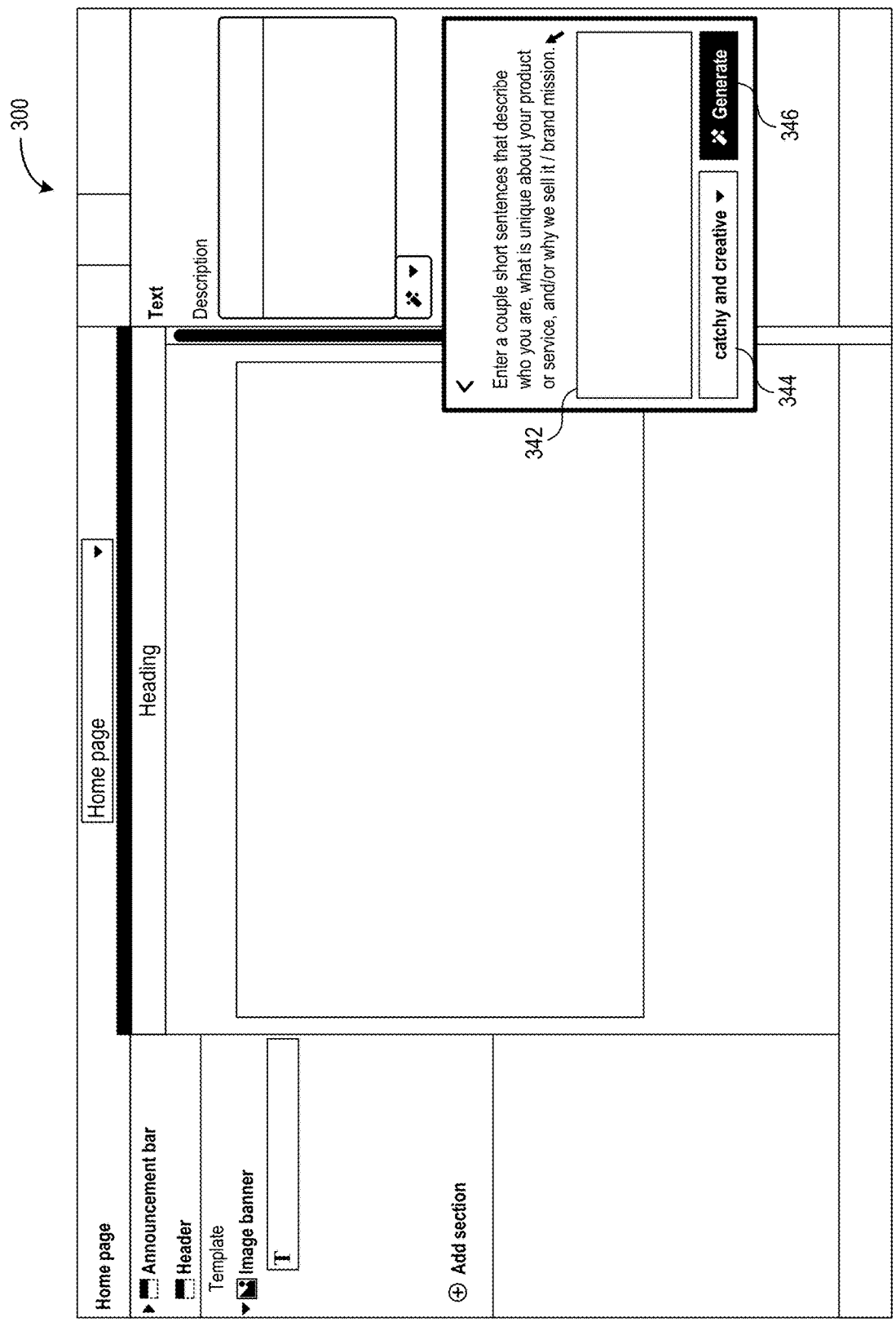

FIGS. 3B-3C illustrate example user interactions with an interface 300 generated by the website development tool 205. In the example of FIG. 3B, a user interacts with the interface 300 to generate text for an image banner section of a webpage. When a user interacts with a menu control 332 in the section editing pane 330, the interface displays controls to automatically generate text or to modify text. For example, the user can select the control 333 to cause the website development system to generate a "Frequently Asked Questions" description or a control 335 to generate an "About Us" description. Alternatively, the user can select a control 337 to improve writing of an existing description or a control 339 to fix spelling and grammar of the pre-written description.

FIG. 3C illustrates an example interface displayed when the user selects the control 335, requesting automatic generation of text for an "about us" section. When the user requests automatic text generation, the website development system obtains a prompt template for the section and evaluates whether values for the parameters in the obtained template can be determined based on the existing website data. For any parameter that the system does not determine, a request for input can be presented to the user. In the example of FIG. 3C, the website development system asks the user for input, via a textbox 342, of a short description of the user's company, products or services, or brand mission. The system also requests user selection of a tone from a menu 344. When the user selects the "generate" control 346, the website development system uses the prompt template, any automatically determined parameter values, and the parameter values input by the user to generate a prompt to the LLM.

Automatic Generation of LLM Prompts

Figure 4:
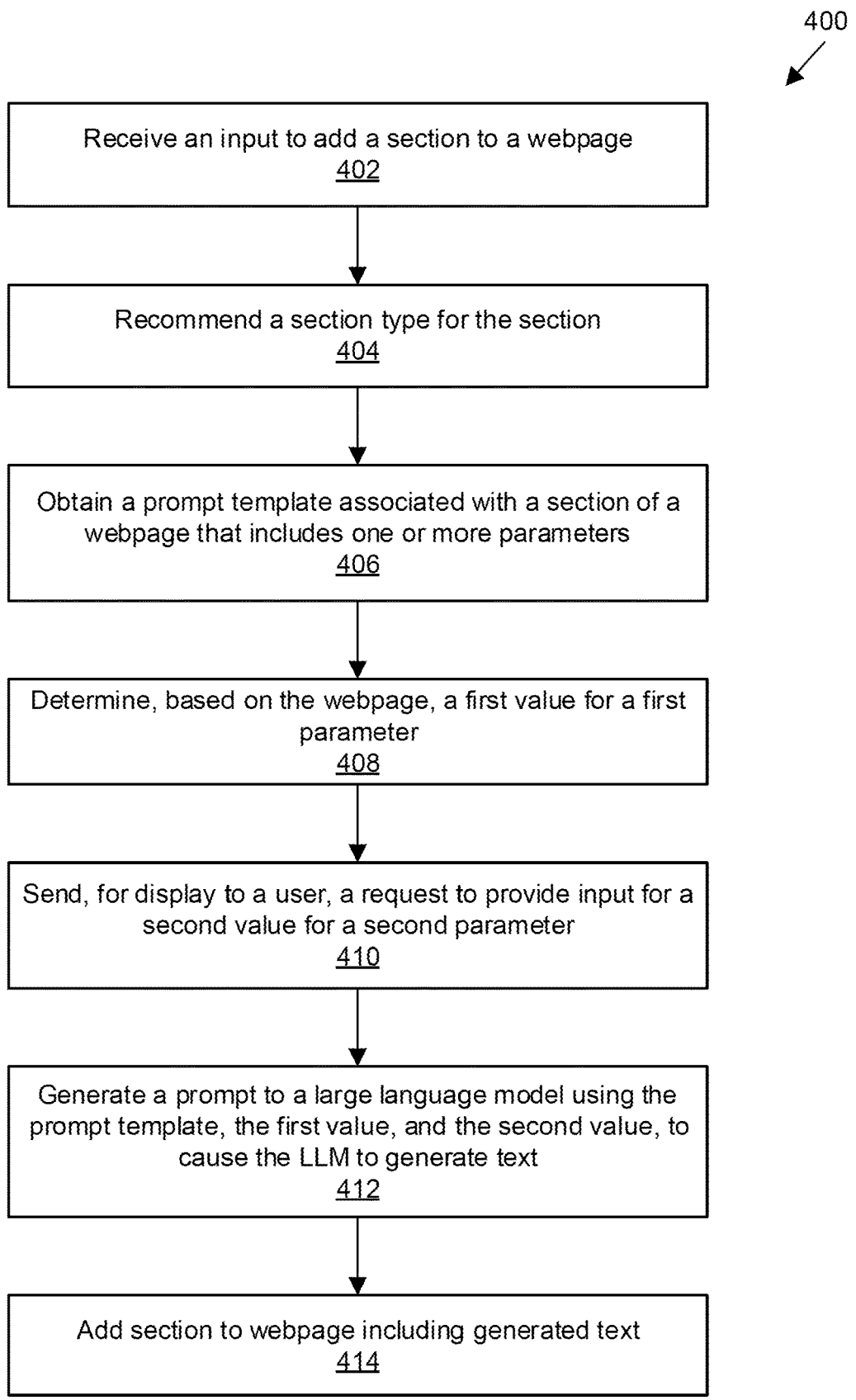
FIG. 4 is a flowchart illustrating a process for automating generation of prompts to a large language model, according to some implementations.

FIG. 4 is a flowchart illustrating a process 400 for automating generation of prompts to a large language model, according to some implementations. The process 400 can be performed by a computer system, such as the website development system 120. Other implementations of the process 400 include additional, fewer, or different steps, or perform the steps in different orders. For example, although the illustrated process includes steps for adding a new section to a webpage and generating a prompt to an LLM in response to the new section being added, the steps for adding the new webpage section can be omitted while prompts to the LLM are generated in similar ways to modify text in a section that already exists.

At operation 402, the computer system receives an input to add a section to a webpage. In response to the input, the computer system can recommend a section type for the section at 404. The recommendation for the section type can be generated using a machine learning model that is trained based on layouts of other webpages to predict a likely next section type for the webpage based on the current contents of the webpage. Section types can additionally or alternatively be recommended based on the targeted location for the new section on the webpage. A user can accept the recommended section type to continue adding the section type to the webpage or can select a different section type. In some implementations, the section is added to the webpage with default values that can be modified as the process 400 continues.

At operation 406, the computer system obtains a prompt template associated with the section type of a target section. The target section can be a new section to be added to the webpage, whether the section type of the new section was programmatically recommended by the computer system (e.g., at operation 402) or selected by the user. Alternatively, the user can select a target section that was previously added to the webpage in order to modify existing content of the target section.

At operation 408, the computer system determines, based on the webpage, a first value for a first parameter in the prompt template. For some types of parameters, the first value can be retrieved from another section of the webpage, such as explicit information the user input when creating the other section. Similarly, a value for some types of parameters can be retrieved from metadata associated with the webpage or a user or entity account associated with the user creating the webpage or the entity operating the webpage. For other types of parameters, the computer system processes other content on the webpage to determine the parameter value. For example, the system evaluates a tone of other text on the page to select a tone to use to generate text for a new section.

At operation 410, the computer system sends a request to a user to provide input for a second value of a second parameter in the template. User input can be requested, for example, when the system determines that a value for a given parameter is unknown or cannot be determined with sufficient confidence from the webpage data. Alternatively, the system can request user input to select from among multiple candidate values for a parameter or to confirm a value determined by the system.

Using the prompt template and the first and second parameter values, the computer system generates, at operation 412, a prompt to a large language model to cause the LLM to generate text. The text generated by the LLM can be output to the user for approval or to enable the user to request regeneration of the text. In some implementations, if regeneration of the text is requested, the computer system requests additional input from the user to generate a new prompt. For example, the computer system sends the user information about one or more automatically determined parameter values, enabling the user to confirm or modify the values. If the user supplies a modified value to replace an automatically determined value, the system modifies the prompt to the LLM to include the modified value instead of the automatically determined value.

Once the generated text has been approved by the user, at operation 414, the computer system adds the generated text to the section on the webpage.

The process 400 can be repeated as the user adds additional sections to the website or modifies existing sections. As the user supplies inputs for parameter values, the computer system stores the inputs for use in generating prompt templates for future sections of the webpage. Accordingly, as steps of the process 400 are repeated to generate additional text for a website, fewer user inputs may be needed over time, and some prompts may be generated automatically without any additional user input.

Neural Networks and Machine Learning

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g. each data entry in the training dataset may be paired with a label), or may be unlabeled.

Training a ML model generally involves inputting into an ML model (e.g. an untrained ML model) training data to be processed by the ML model, processing the training data using the ML model, collecting the output generated by the ML model (e.g. based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

Figure 5A:
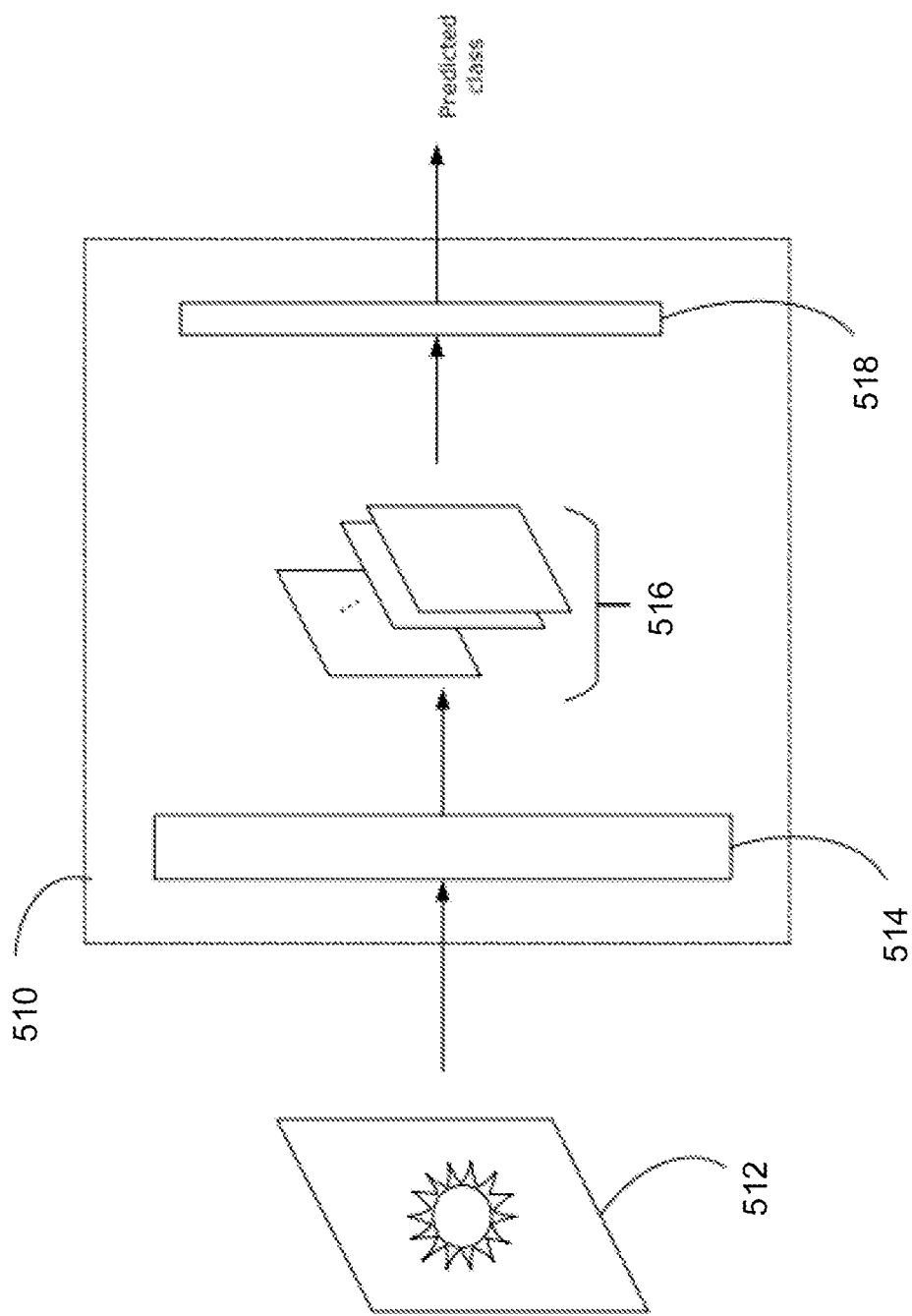
FIG. 5A is a block diagram of a simplified convolutional neural network, which may be used in examples of the present disclosure.

FIG. 5A is a simplified diagram of an example CNN 510, which is an example of a DNN that is commonly used for image processing tasks such as image classification, image analysis, object segmentation, etc. An input to the CNN 510 may be a 2D RGB image 512.

The CNN 510 includes a plurality of layers that process the image 512 in order to generate an output, such as a predicted classification or predicted label for the image 512. For simplicity, only a few layers of the CNN 510 are illustrated including at least one convolutional layer 514. The convolutional layer 514 performs convolution processing, which may involve computing a dot product between the input to the convolutional layer 514 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 514 is a set of feature maps 516 (sometimes referred to as activation maps). Each feature map 516 generally has smaller width and height than the image 512. The set of feature maps 516 encode image features that may be processed by subsequent layers of the CNN 510, depending on the design and intended task for the CNN 510. In this example, a fully connected layer 518 processes the set of feature maps 516 in order to perform a classification of the image, based on the features encoded in the set of feature maps 516. The fully connected layer 518 contains learned parameters that, when applied to the set of feature maps 516, outputs a set of probabilities representing the likelihood that the image 512 belongs to each of a defined set of possible classes. The class having the highest probability may then be outputted as the predicted classification for the image 512.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 5B:
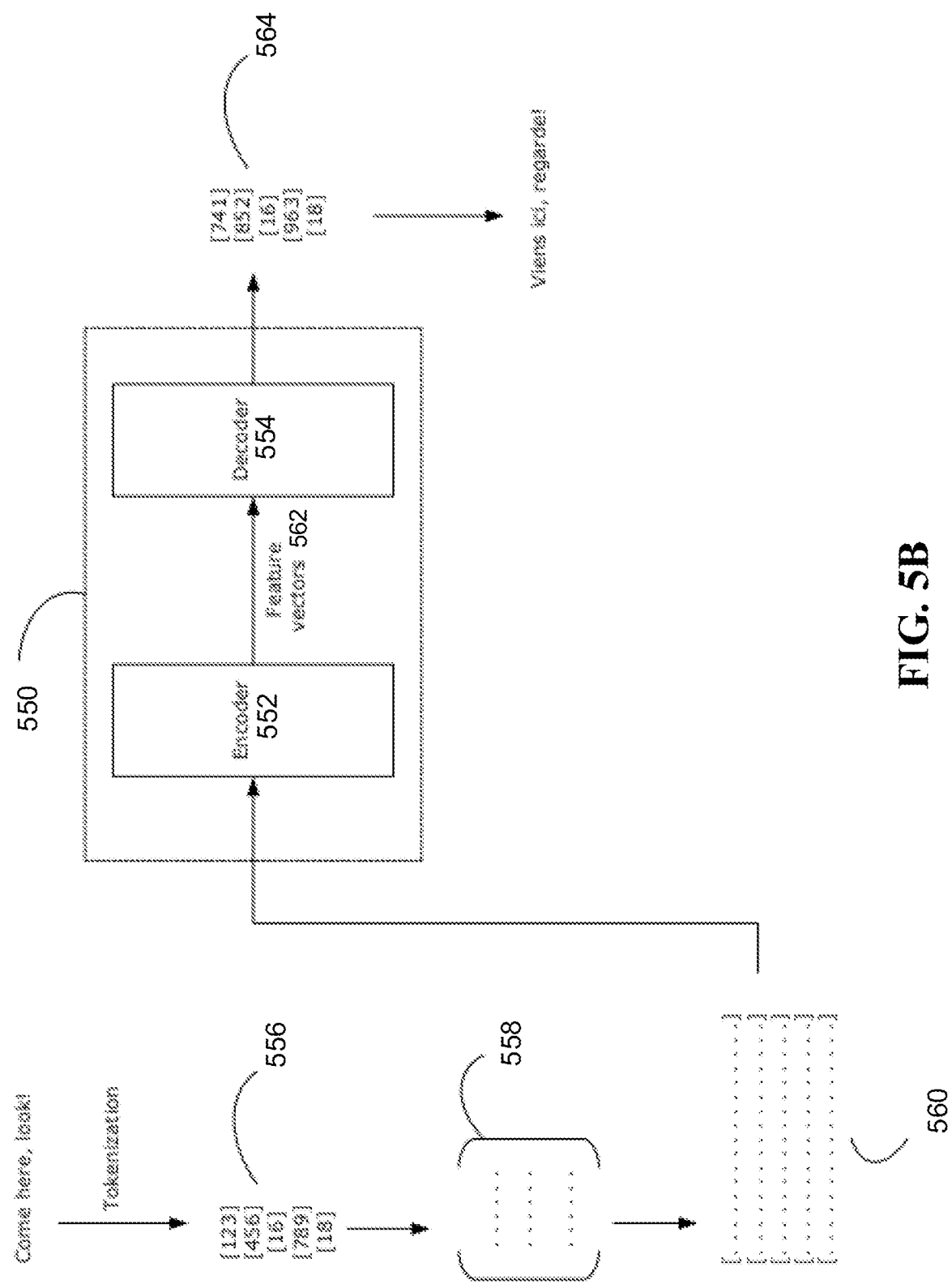
FIG. 5B is a block diagram of a simplified transformer neural network, which may be used in examples of the present disclosure.

FIG. 5B is a simplified diagram of an example transformer 550, and a simplified discussion of its operation is now provided. The transformer 550 includes an encoder 552 (which may comprise one or more encoder layers/blocks connected in series) and a decoder 554 (which may comprise one or more decoder layers/blocks connected in series). Generally, the encoder 552 and the decoder 554 each include a plurality of neural network layers, at least one of which may be a self-attention layer. The parameters of the neural network layers may be referred to as the parameters of the language model.

The transformer 550 may be trained on a text corpus that is labelled (e.g., annotated to indicate verbs, nouns, etc.) or unlabelled. LLMs may be trained on a large unlabelled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 550 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 5B, a short sequence of tokens 556 corresponding to the text sequence "Come here, look!" is illustrated as input to the transformer 550. Tokenization of the text sequence into the tokens 556 may be performed by some pre-processing tokenization module such as, for example, a byte pair encoding tokenizer (the "pre" referring to the tokenization occurring prior to the processing of the tokenized input by the LLM), which is not shown in FIG. 5B for simplicity. In general, the token sequence that is inputted to the transformer 550 may be of any length up to a maximum length defined based on the dimensions of the transformer 550 (e.g., such a limit may be 2048 tokens in some LLMs). Each token 556 in the token sequence is converted into an embedding vector 560 (also referred to simply as an embedding). An embedding 560 is a learned numerical representation (such as, for example, a vector) of a token that captures some semantic meaning of the text segment represented by the token 556. The embedding 560 represents the text segment corresponding to the token 556 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 560 corresponding to the "look" token will be closer to another embedding corresponding to the "see" token in the vector space, as compared to the distance between the embedding 560 corresponding to the "look" token and another embedding corresponding to the "cake" token. The vector space may be defined by the dimensions and values of the embedding vectors. Various techniques may be used to convert a token 556 to an embedding 560. For example, another trained ML model may be used to convert the token 556 into an embedding 560. In particular, another trained ML model may be used to convert the token 556 into an embedding 560 in a way that encodes additional information into the embedding 560 (e.g., a trained ML model may encode positional information about the position of the token 556 in the text sequence into the embedding 560). In some examples, the numerical value of the token 556 may be used to look up the corresponding embedding in an embedding matrix 558 (which may be learned during training of the transformer 550).

The generated embeddings 560 are input into the encoder 552. The encoder 552 serves to encode the embeddings 560 into feature vectors 562 that represent the latent features of the embeddings 560. The encoder 552 may encode positional information (i.e., information about the sequence of the input) in the feature vectors 562. The feature vectors 562 may have very high dimensionality (e.g., on the order of thousands or tens of thousands), with each element in a feature vector 562 corresponding to a respective feature. The numerical weight of each element in a feature vector 562 represents the importance of the corresponding feature. The space of all possible feature vectors 562 that can be generated by the encoder 552 may be referred to as the latent space or feature space.

Conceptually, the decoder 554 is designed to map the features represented by the feature vectors 562 into meaningful output, which may depend on the task that was assigned to the transformer 550. For example, if the transformer 550 is used for a translation task, the decoder 554 may map the feature vectors 562 into text output in a target language different from the language of the original tokens 556. Generally, in a generative language model, the decoder 554 serves to decode the feature vectors 562 into a sequence of tokens. The decoder 554 may generate output tokens 564 one by one. Each output token 564 may be fed back as input to the decoder 554 in order to generate the next output token 564. By feeding back the generated output and applying self-attention, the decoder 554 is able to generate a sequence of output tokens 564 that has sequential meaning (e.g., the resulting output text sequence is understandable as a sentence and obeys grammatical rules). The decoder 554 may generate output tokens 564 until a special [EOT] token (indicating the end of the text) is generated. The resulting sequence of output tokens 564 may then be converted to a text sequence in post-processing. For example, each output token 564 may be an integer number that corresponds to a vocabulary index. By looking up the text segment using the vocabulary index, the text segment corresponding to each output token 564 can be retrieved, the text segments can be concatenated together and the final output text sequence (in this example, "Viens ici, regarde!") can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 6:
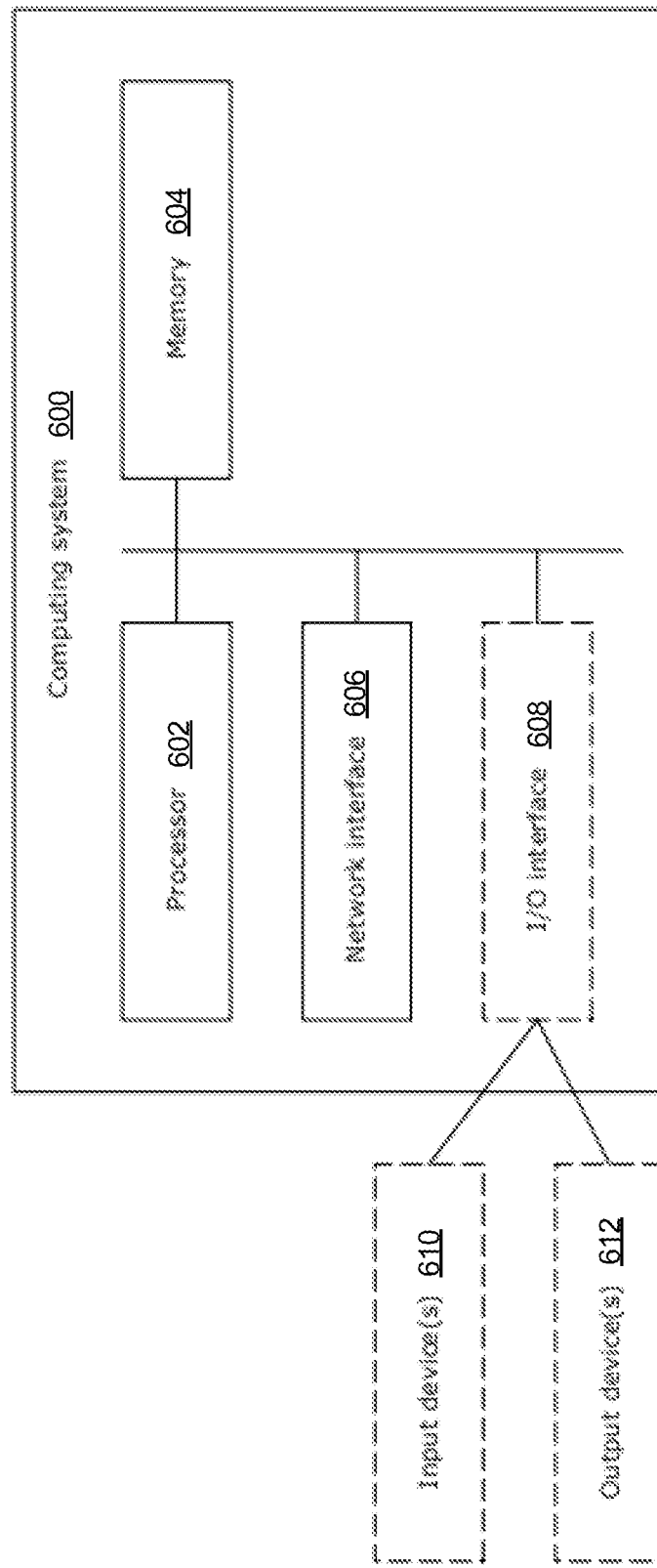
FIG. 6 is a block diagram of an example computing system, which may be used to implement examples of the present disclosure.

FIG. 6 illustrates an example computing system 600, which may be used to implement examples of the present disclosure, such as a prompt generation engine to generate prompts to be provided as input to a language model such as a LLM. Additionally or alternatively, one or more instances of the example computing system 600 may be employed to execute the LLM. For example, a plurality of instances of the example computing system 600 may cooperate to provide output using an LLM in manners as discussed above.

The example computing system 600 includes at least one processing unit, such as a processor 602, and at least one physical memory 604. The processor 602 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 604 may include a volatile or non-volatile memory (e.g., a flash memory, a random access memory (RAM), and/or a read-only memory (ROM)). The memory 604 may store instructions for execution by the processor 602, to the computing system 600 to carry out examples of the methods, functionalities, systems and modules disclosed herein.

The computing system 600 may also include at least one network interface 606 for wired and/or wireless communications with an external system and/or network (e.g., an intranet, the Internet, a P2P network, a WAN and/or a LAN). A network interface may enable the computing system 600 to carry out communications (e.g., wireless communications) with systems external to the computing system 600, such as a language model residing on a remote system.

The computing system 600 may optionally include at least one input/output (I/O) interface 608, which may interface with optional input device(s) 610 and/or optional output device(s) 612. Input device(s) 610 may include, for example, buttons, a microphone, a touchscreen, a keyboard, etc. Output device(s) 612 may include, for example, a display, a speaker, etc. In this example, optional input device(s) 610 and optional output device(s) 612 are shown external to the computing system 600. In other examples, one or more of the input device(s) 610 and/or output device(s) 612 may be an internal component of the computing system 600.

A computing system, such as the computing system 600 of FIG. 6, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

An Example E-Commerce Platform

In an example use of the implementations described herein, the rating system 110 is used to rate or offer suggestions for improvement of textual descriptions for products in an online store. Although integration with a commerce platform is not required, in some embodiments, the methods disclosed herein may be performed on or in association with a commerce platform such as an e-commerce platform. Therefore, an example of a commerce platform will be described.

Figure 7:
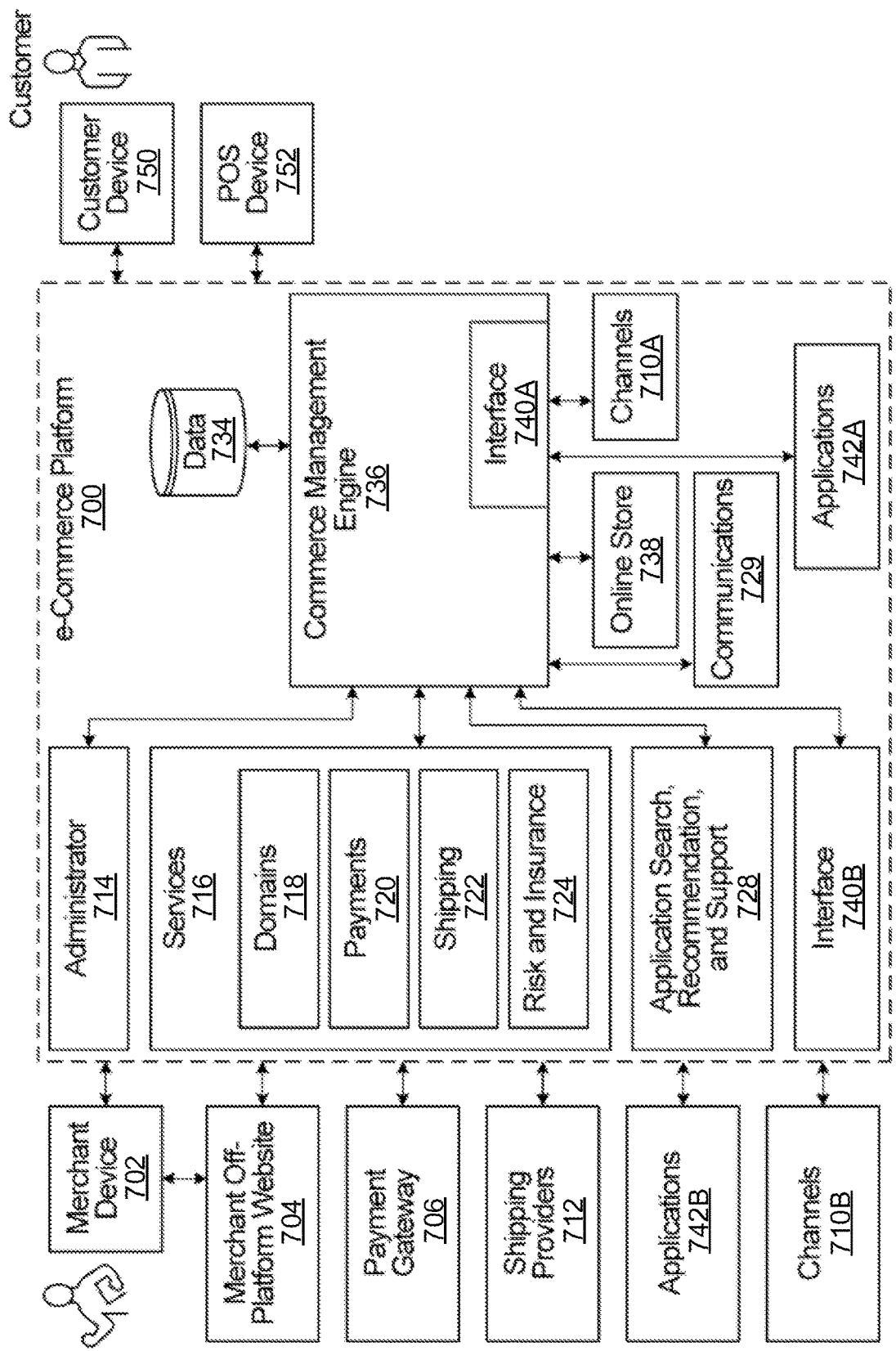
FIG. 7 illustrates an example e-commerce platform, according to some implementations.

FIG. 7 illustrates an example e-commerce platform 700, according to one embodiment. The e-commerce platform 700 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 700 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 700 for potential use in marketing and selling products, and the like), a service provider user (e.g., a shipping provider 712, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 700 provides merchants with online services/facilities to manage their business. The facilities described herein are shown implemented as part of the platform 700 but could also be configured separately from the platform 700, in whole or in part, as stand-alone services. Furthermore, such facilities may, in some embodiments, may, additionally or alternatively, be provided by one or more providers/entities.

In the example of FIG. 7, the facilities are deployed through a machine, service or engine that executes computer software, modules, program codes, and/or instructions on one or more processors which, as noted above, may be part of or external to the platform 700. Merchants may utilize the e-commerce platform 700 for enabling or managing commerce with customers, such as by implementing an e-commerce experience with customers through an online store 738, applications 742A-B, channels 710A-B, and/or through point of sale (POS) devices 752 in physical locations (e.g., a physical storefront or other location such as through a kiosk, terminal, reader, printer, 3D printer, and the like). A merchant may utilize the e-commerce platform 700 as a sole commerce presence with customers, or in conjunction with other merchant commerce facilities, such as through a physical store (e.g., 'brick-and-mortar' retail stores), a merchant off-platform website 704 (e.g., a commerce Internet website or other internet or web property or asset supported by or on behalf of the merchant separately from the e-commerce platform 700), an application 742B, and the like. However, even these 'other' merchant commerce facilities may be incorporated into or communicate with the e-commerce platform 700, such as where POS devices 752 in a physical store of a merchant are linked into the e-commerce platform 700, where a merchant off-platform website 704 is tied into the e-commerce platform 700, such as, for example, through 'buy buttons' that link content from the merchant off platform website 704 to the online store 738, or the like.

The online store 738 may represent a multi-tenant facility comprising a plurality of virtual storefronts. In embodiments, merchants may configure and/or manage one or more storefronts in the online store 738, such as, for example, through a merchant device 702 (e.g., computer, laptop computer, mobile computing device, and the like), and offer products to customers through a number of different channels 710A-B (e.g., an online store 738; an application 742A-B; a physical storefront through a POS device 752; an electronic marketplace, such, for example, through an electronic buy button integrated into a website or social media channel such as on a social network, social media page, social media messaging system; and/or the like). A merchant may sell across channels 710A-B and then manage their sales through the e-commerce platform 700, where channels 710A may be provided as a facility or service internal or external to the e-commerce platform 700. A merchant may, additionally or alternatively, sell in their physical retail store, at pop ups, through wholesale, over the phone, and the like, and then manage their sales through the e-commerce platform 700. A merchant may employ all or any combination of these operational modalities. Notably, it may be that by employing a variety of and/or a particular combination of modalities, a merchant may improve the probability and/or volume of sales. Throughout this disclosure the terms online store 738 and storefront may be used synonymously to refer to a merchant's online e-commerce service offering through the e-commerce platform 700, where an online store 738 may refer either to a collection of storefronts supported by the e-commerce platform 700 (e.g., for one or a plurality of merchants) or to an individual merchant's storefront (e.g., a merchant's online store).

In some embodiments, a customer may interact with the platform 700 through a customer device 750 (e.g., computer, laptop computer, mobile computing device, or the like), a POS device 752 (e.g., retail device, kiosk, automated (self-service) checkout system, or the like), and/or any other commerce interface device known in the art. The e-commerce platform 700 may enable merchants to reach customers through the online store 738, through applications 742A-B, through POS devices 752 in physical locations (e.g., a merchant's storefront or elsewhere), to communicate with customers via electronic communication facility 729, and/or the like so as to provide a system for reaching customers and facilitating merchant services for the real or virtual pathways available for reaching and interacting with customers.

In some embodiments, and as described further herein, the e-commerce platform 700 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 700 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 700, merchant devices 702, payment gateways 706, applications 742A-B, channels 710A-B, shipping providers 712, customer devices 750, point of sale devices 752, etc. In some implementations, the processing facility may be or may include one or more such computing devices acting in concert. For example, it may be that a plurality of co-operating computing devices serves as/to provide the processing facility. The e-commerce platform 700 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 738) is provided as a service, and is centrally hosted (e.g., and then accessed by users via a web browser or other application, and/or through customer devices 750, POS devices 752, and/or the like). In some embodiments, elements of the e-commerce platform 700 may be implemented to operate and/or integrate with various other platforms and operating systems.

In some embodiments, the facilities of the e-commerce platform 700 (e.g., the online store 738) may serve content to a customer device 750 (using data 734) such as, for example, through a network connected to the e-commerce platform 700. For example, the online store 738 may serve or send content in response to requests for data 734 from the customer device 750, where a browser (or other application) connects to the online store 738 through a network using a network communication protocol (e.g., an internet protocol). The content may be written in machine readable language and may include Hypertext Markup Language (HTML), template language, JavaScript, and the like, and/or any combination thereof.

In some embodiments, online store 738 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 738 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 738, such as through blogs, articles, landing pages, and the like, as well as configure navigation menus. Merchants may upload images (e.g., for products), video, content, data, and the like to the e-commerce platform 700, such as for storage by the system (e.g., as data 734). In some embodiments, the e-commerce platform 700 may provide functions for manipulating such images and content such as, for example, functions for resizing images, associating an image with a product, adding and associating text with an image, adding an image for a new product variant, protecting images, and the like.

As described herein, the e-commerce platform 700 may provide merchants with sales and marketing services for products through a number of different channels 710A-B, including, for example, the online store 738, applications 742A-B, as well as through physical POS devices 752 as described herein. The e-commerce platform 700 may, additionally or alternatively, include business support services 716, an administrator 714, a warehouse management system, and the like associated with running an on-line business, such as, for example, one or more of providing a domain registration service 718 associated with their online store, payment services 720 for facilitating transactions with a customer, shipping services 722 for providing customer shipping options for purchased products, fulfillment services for managing inventory, risk and insurance services 724 associated with product protection and liability, merchant billing, and the like. Services 716 may be provided via the e-commerce platform 700 or in association with external facilities, such as through a payment gateway 706 for payment processing, shipping providers 712 for expediting the shipment of products, and the like.

In some embodiments, the e-commerce platform 700 may be configured with shipping services 722 (e.g., through an e-commerce platform shipping facility or through a third-party shipping carrier), to provide various shipping-related information to merchants and/or their customers such as, for example, shipping label or rate information, real-time delivery updates, tracking, and/or the like.

A home page of an administrator 714 may be referred to as an administrative console and/or an administrator console. The administrator 714 may show information about daily tasks, a store's recent activity, and the next steps a merchant can take to build their business. In some embodiments, a merchant may log in to the administrator 714 via a merchant device 702 (e.g., a desktop computer or mobile device), and manage aspects of their online store 738, such as, for example, viewing the online store's 738 recent visit or order activity, updating the online store's 738 catalog, managing orders, and/or the like. In some embodiments, the merchant may be able to access the different sections of the administrator 714 by using a sidebar, such as the one shown on FIG. 6. Sections of the administrator 714 may include various interfaces for accessing and managing core aspects of a merchant's business, including orders, products, customers, available reports and discounts. The administrator 714 may, additionally or alternatively, include interfaces for managing sales channels for a store including the online store 738, mobile application(s) made available to customers for accessing the store (Mobile App), POS devices, and/or a buy button. The administrator 714 may, additionally or alternatively, include interfaces for managing applications (apps) installed on the merchant's account; and settings applied to a merchant's online store 738 and account. A merchant may use a search bar to find products, pages, or other information in their store.

More detailed information about commerce and visitors to a merchant's online store 738 may be viewed through reports or metrics. Reports may include, for example, acquisition reports, behavior reports, customer reports, finance reports, marketing reports, sales reports, product reports, and custom reports. The merchant may be able to view sales data for different channels 710A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 738, such as based on account status, growth, recent customer activity, order updates, and the like. Notifications may be provided to assist a merchant with navigating through workflows configured for the online store 738, such as, for example, a payment workflow, an order fulfillment workflow, an order archiving workflow, a return workflow, and the like.

The e-commerce platform 700 may provide for a communications facility 729 and associated merchant interface for providing electronic communications and marketing, such as utilizing an electronic messaging facility for collecting and analyzing communication interactions between merchants, customers, merchant devices 702, customer devices 750, POS devices 752, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 729 is configured to provide automated responses to customer requests and/or provide recommendations to the merchant on how to respond such as, for example, to improve the probability of a sale.

The e-commerce platform 700 may provide a financial facility 720 for secure financial transactions with customers, such as through a secure card server environment. The e-commerce platform 700 may store credit card information, such as in payment card industry data (PCI) environments (e.g., a card server), to reconcile financials, bill merchants, perform automated clearing house (ACH) transfers between the e-commerce platform 700 and a merchant's bank account, and the like. The financial facility 720 may also provide merchants and buyers with financial support, such as through the lending of capital (e.g., lending funds, cash advances, and the like) and provision of insurance. In some embodiments, online store 738 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 700. In some embodiments, the e-commerce platform 700 may store this data in a data facility 734. Referring again to FIG. 7, in some embodiments the e-commerce platform 700 may include a commerce management engine 736 such as may be configured to perform various workflows for task automation or content management related to products, inventory, customers, orders, suppliers, reports, financials, risk and fraud, and the like. In some embodiments, additional functionality may, additionally or alternatively, be provided through applications 742A-B to enable greater flexibility and customization required for accommodating an ever-growing variety of online stores, POS devices, products, and/or services. Applications 742A may be components of the e-commerce platform 700 whereas applications 742B may be provided or hosted as a third-party service external to e-commerce platform 700. The commerce management engine 736 may accommodate store-specific workflows and in some embodiments, may incorporate the administrator 714 and/or the online store 738.

Implementing functions as applications 742A-B may enable the commerce management engine 736 to remain responsive and reduce or avoid service degradation or more serious infrastructure failures, and the like.

Although isolating online store data can be important to maintaining data privacy between online stores 738 and merchants, there may be reasons for collecting and using cross-store data, such as for example, with an order risk assessment system or a platform payment facility, both of which require information from multiple online stores 738 to perform well. In some embodiments, it may be preferable to move these components out of the commerce management engine 736 and into their own infrastructure within the e-commerce platform 700.

Platform payment facility 720 is an example of a component that utilizes data from the commerce management engine 736 but is implemented as a separate component or service. The platform payment facility 720 may allow customers interacting with online stores 738 to have their payment information stored safely by the commerce management engine 736 such that they only have to enter it once. When a customer visits a different online store 738, even if they have never been there before, the platform payment facility 720 may recall their information to enable a more rapid and/or potentially less-error prone (e.g., through avoidance of possible mis-keying of their information if they needed to instead re-enter it) checkout. This may provide a cross-platform network effect, where the e-commerce platform 700 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 738.

For functions that are not included within the commerce management engine 736, applications 742A-B provide a way to add features to the e-commerce platform 700 or individual online stores 738. For example, applications 742A-B may be able to access and modify data on a merchant's online store 738, perform tasks through the administrator 714, implement new flows for a merchant through a user interface (e.g., that is surfaced through extensions/API), and the like. Merchants may be enabled to discover and install applications 742A-B through application search, recommendations, and support 728. In some embodiments, the commerce management engine 736, applications 742A-B, and the administrator 714 may be developed to work together. For instance, application extension points may be built inside the commerce management engine 736, accessed by applications 742A and 742B through the interfaces 740B and 740A to deliver additional functionality, and surfaced to the merchant in the user interface of the administrator 714.

In some embodiments, applications 742A-B may deliver functionality to a merchant through the interface 740A-B, such as where an application 742A-B is able to surface transaction data to a merchant (e.g., App: "Engine, surface my app data in the Mobile App or administrator 714"), and/or where the commerce management engine 736 is able to ask the application to perform work on demand (Engine: "App, give me a local tax calculation for this checkout").

Applications 742A-B may be connected to the commerce management engine 736 through an interface 740A-B (e.g., through REST (REpresentational State Transfer) and/or GraphQL APIs) to expose the functionality and/or data available through and within the commerce management engine 736 to the functionality of applications. For instance, the e-commerce platform 700 may provide API interfaces 740A-B to applications 742A-B which may connect to products and services external to the platform 700. The flexibility offered through use of applications and APIs (e.g., as offered for application development) enable the e-commerce platform 700 to better accommodate new and unique needs of merchants or to address specific use cases without requiring constant change to the commerce management engine 736. For instance, shipping services 722 may be integrated with the commerce management engine 736 through a shipping or carrier service API, thus enabling the e-commerce platform 700 to provide shipping service functionality without directly impacting code running in the commerce management engine 736.

Depending on the implementation, applications 742A-B may utilize APIs to pull data on demand (e.g., customer creation events, product change events, or order cancelation events, etc.) or have the data pushed when updates occur. A subscription model may be used to provide applications 742A-B with events as they occur or to provide updates with respect to a changed state of the commerce management engine 736. In some embodiments, when a change related to an update event subscription occurs, the commerce management engine 736 may post a request, such as to a predefined callback URL. The body of this request may contain a new state of the object and a description of the action or event. Update event subscriptions may be created manually, in the administrator facility 714, or automatically (e.g., via the API 740A-B). In some embodiments, update events may be queued and processed asynchronously from a state change that triggered them, which may produce an update event notification that is not distributed in real-time or near-real time.

In some embodiments, the e-commerce platform 700 may provide one or more of application search, recommendation and support 728. Application search, recommendation and support 728 may include developer products and tools to aid in the development of applications, an application dashboard (e.g., to provide developers with a development interface, to administrators for management of applications, to merchants for customization of applications, and the like), facilities for installing and providing permissions with respect to providing access to an application 742A-B (e.g., for public access, such as where criteria must be met before being installed, or for private use by a merchant), application searching to make it easy for a merchant to search for applications 742A-B that satisfy a need for their online store 738, application recommendations to provide merchants with suggestions on how they can improve the user experience through their online store 738, and the like. In some embodiments, applications 742A-B may be assigned an application identifier (ID), such as for linking to an application (e.g., through an API), searching for an application, making application recommendations, and the like.

Applications 742A-B may be grouped roughly into three categories: customer-facing applications, merchant-facing applications, integration applications, and the like. Customer-facing applications 742A-B may include an online store 738 or channels 710A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 742A-B may include applications that allow the merchant to administer their online store 738 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 712 and payment gateways 706.

As such, the e-commerce platform 700 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 710A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 710A-B such as, for example, the merchant's online store 738, a physical storefront through a POS device 752; an electronic marketplace, through an electronic buy button integrated into a website or a social media channel). In some cases, channels 710A-B may be modeled as applications 742A-B A merchandising component in the commerce management engine 736 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 736 may be configured to receive customer information to complete the order such as the customer's contact information, billing information and/or shipping details. If the customer inputs their contact information but does not proceed to payment, the e-commerce platform 700 may (e.g., via an abandoned checkout component) to transmit a message to the customer device 750 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 736 may be configured to communicate with various payment gateways and services 706 (e.g., online payment systems, mobile payment systems, digital wallets, credit card gateways) via a payment processing component. The actual interactions with the payment gateways 706 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 736 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 736 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 736. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 700 may make the merchant aware of compliance issues with respect to legal obligations (e.g., with respect to taxes). In some embodiments, the e-commerce platform 700 may enable merchants to keep track of changes to the contract of sales over time, such as implemented through a sales model component (e.g., an append-only date-based ledger that records sale-related events that happened to an item).

Implementation in an E-Commerce Platform

Figure 8:
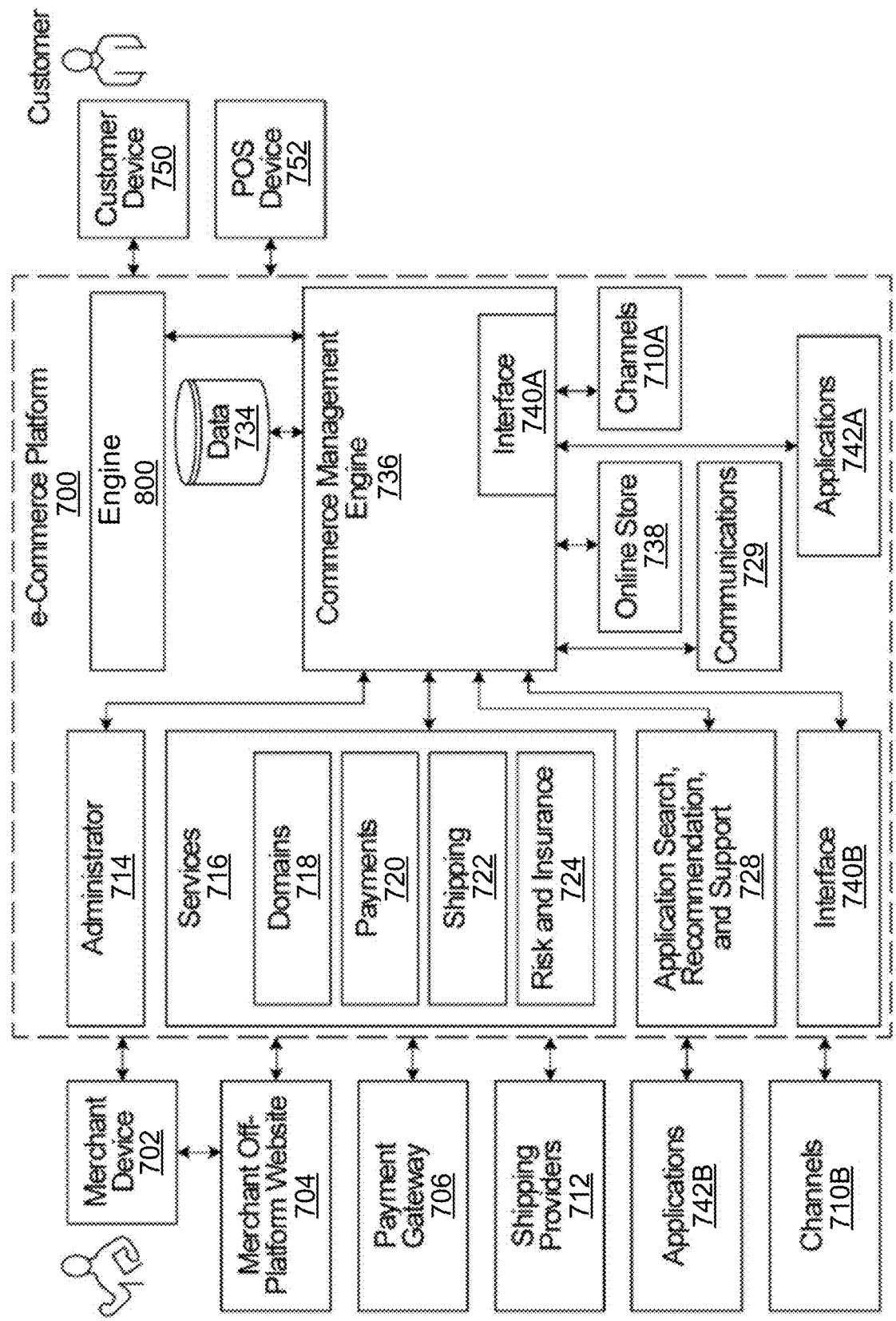
FIG. 8 illustrates another implementation of an e-commerce platform.

The functionality described herein may be used in commerce to provide improved customer or buyer experiences. The e-commerce platform 700 could implement the functionality for any of a variety of different applications, examples of which are described elsewhere herein. FIG. 8 illustrates the e-commerce platform 700 of FIG. 7 but including an engine 800. The engine 700 is an example of a computer-implemented system that implements the functionality described herein for use by the e-commerce platform 700, the customer device 750 and/or the merchant device 702.

Although the engine 700 is illustrated as a distinct component of the e-commerce platform 700 in FIG. 8, this is only an example. An engine could also or instead be provided by another component residing within or external to the e-commerce platform 700. In some embodiments, either or both of the applications 742A-B provide an engine that implements the functionality described herein to make it available to customers and/or to merchants. Furthermore, in some embodiments, the commerce management engine 736 provides that engine. However, the location of the engine 700 is implementation specific. In some implementations, the engine 700 is provided at least in part by an e-commerce platform, either as a core function of the e-commerce platform or as an application or service supported by or communicating with the e-commerce platform. Alternatively, the engine 700 may be implemented as a stand-alone service to clients such as a customer device 750 or a merchant device 702. In addition, at least a portion of such an engine could be implemented in the merchant device 702 and/or in the customer device 750. For example, the customer device 750 could store and run an engine locally as a software application The engine 700 could implement at least some of the functionality described herein. Although the embodiments described herein may be implemented in association with an e-commerce platform, such as (but not limited to) the e-commerce platform 700, the embodiments described herein are not limited to e-commerce platforms

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application

I claim:

1. A computer-implemented method comprising:
obtaining a prompt template associated with a section of a webpage, the prompt template including one or more parameters;
determining, based on the webpage, a first value for a first one of the one or more parameters;
sending for display to a user, a request to provide input for a second value corresponding to a second one of the one or more parameters; and
generating, using the prompt template and the first value and the second value, a prompt to a large language model to generate text for the section of the webpage.

2. The computer-implemented method of claim 1, wherein sending the request for display to the user comprises:
selecting, based on the webpage, multiple candidate values for the second value;
sending the candidate values for display to the user; and
in response to receiving a selection from among the candidate values, identifying the selected candidate value as the second value.

3. The computer-implemented method of claim 1, wherein sending the request for display to the user comprises:
predicting the second value based on the webpage;
determining a confidence score for the prediction of the second value is less than a threshold; and
sending the request to provide input for the second value to the user in response to determining the confidence score is less than the threshold.

4. The computer-implemented method of claim 1, further comprising:
sending the generated text for display to a user; and
in response to receiving a request from the user to regenerate the text:
sending information indicative of the first value for display to the user; and
in response to receiving, from the user, a third value to replace the determined first value, modifying the prompt to the large language model based on the third value and the prompt template.

5. The computer-implemented method of claim 1, further comprising:
receiving an input to add the section to the webpage, wherein the prompt to the large language model is generated in response to receiving the input;
generating the section on the webpage; and
adding the generated text to the generated section of the webpage.

6. The computer-implemented method of claim 5, further comprising:
recommending a section type for the section to be added to the webpage, wherein the recommended section type is one of multiple section types available for adding to the webpage and wherein each of the multiple types of sections is associated with a different prompt template;
wherein obtaining the prompt template associated with the section of the webpage comprises obtaining the prompt template associated with the recommended section type of the section.

7. The computer-implemented method of claim 6, wherein recommending the section type for the section to be added to the webpage comprises:
using a trained machine learning model to generate the recommended section type based on current contents of the webpage, wherein the trained machine learning model is trained based on layouts of other webpages to predict a likely next section type for the webpage based on the current contents of the webpage.

8. The computer-implemented method of claim 6, wherein receiving the input to add the section to the webpage comprises receiving a specified location for the section on the webpage, and wherein recommending the section type of the section to be added to the webpage comprises:
selecting the recommended section type based on the specified location for the section.

9. The computer-implemented method of claim 8, further comprising:
receiving an input to move the section from the specified location to a second location on the webpage; and
modifying the section type of the section based on the second location;
wherein obtaining the prompt template associated with the section of the webpage comprises retrieving the prompt template that is associated with the modified section type of the section.

10. The computer-implemented method of claim 1, wherein the first one of the one or more parameters specifies a tone for the text, and wherein determining the first value based on the webpage comprises:
sending text retrieved from other sections of the webpage to the large language model for analysis of a tone of the other sections; and
selecting a tone as the first value based on the analysis of the tone of the other sections performed by the large language model.

11. The computer-implemented method of claim 1, wherein the first one of the one or more parameters specifies a tone for the text, and wherein determining the first value based on the webpage comprises:
identifying a product category of a product to be described in the section; and
selecting a tone as the first value based on the product category.

12. The computer-implemented method of claim 1, wherein determining the first value comprises retrieving the first value from another section on the webpage.

13. A non-transitory computer readable storage medium storing executable instructions, execution of which by a processor causing the processor to:
obtain a prompt template associated with a section of a webpage, the prompt template including one or more parameters;
determine, based on the webpage, a first value for a first one of the one or more parameters;
send for display to a user, a request to provide input for a second value corresponding to a second one of the one or more parameters; and
generate, using the prompt template and the first value and the second value, a prompt to a large language model to generate text for the section of the webpage.

14. The non-transitory computer readable storage medium of claim 13, wherein sending the request for display to the user comprises:
selecting, based on the webpage, multiple candidate values for the second value;
sending the candidate values for display to the user; and
in response to receiving a selection from among the candidate values, identifying the selected candidate value as the second value.

15. The non-transitory computer readable storage medium of claim 13, wherein sending the request for display to the user comprises:
predicting the second value based on the webpage;
determining a confidence score for the prediction of the second value is less than a threshold; and
sending the request to provide input for the second value to the user in response to determining the confidence score is less than the threshold.

16. The non-transitory computer readable storage medium of claim 13, further comprising:
receiving an input to add the section to the webpage, wherein the prompt to the large language model is generated in response to receiving the input;
generating the section on the webpage; and
adding the generated text to the generated section of the webpage.

17. The non-transitory computer readable storage medium of claim 16, further comprising:
recommending a section type for the section to be added to the webpage, wherein the recommended section type is one of multiple section types available for adding to the webpage and wherein each of the multiple types of sections is associated with a different prompt template;
wherein obtaining the prompt template associated with the section of the webpage comprises obtaining the prompt template associated with the recommended section type of the section.

18. The non-transitory computer readable storage medium of claim 13, wherein the first one of the one or more parameters specifies a tone for the text, and wherein determining the first value based on the webpage comprises:
sending text retrieved from other sections of the webpage to the large language model for analysis of a tone of the other sections; and
selecting a tone as the first value based on the analysis of the tone of the other sections performed by the large language model.

19. The non-transitory computer readable storage medium of claim 13, wherein determining the first value comprises retrieving the first value from another section on the webpage.

20. A system comprising:
at least one hardware processor; and
at least one non-transitory memory storing instructions, which, when executed by the at least one hardware processor, cause the system to:
obtain a prompt template associated with a section of a webpage, the prompt template including one or more parameters;
determine, based on the webpage, a first value for a first one of the one or more parameters;

send for display to a user, a request to provide input for a second value corresponding to a second one of the one or more parameters; and generate, using the prompt template and the first value and the second value, a prompt to a large language model to generate text for the section of the webpage.

\* \* \* \* \*